United States Patent
Hayward et al.

(10) Patent No.: US 9,519,066 B2
(45) Date of Patent: Dec. 13, 2016

(54) PHOTONIC POLYMER MULTILAYERS FOR COLORIMETRIC RADIATION SENSING

(71) Applicant: The University of Massachusetts, Boston, MA (US)

(72) Inventors: Ryan Hayward, Northampton, MA (US); Maria Chiappelli, Westfield, NJ (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 129 days.

(21) Appl. No.: 14/924,912

(22) Filed: Oct. 28, 2015

(65) Prior Publication Data
US 2016/0252625 A1 Sep. 1, 2016

Related U.S. Application Data

(60) Provisional application No. 62/069,909, filed on Oct. 29, 2014.

(51) Int. Cl.
*G01T 1/06* (2006.01)
*C08L 33/14* (2006.01)

(52) U.S. Cl.
CPC . *G01T 1/06* (2013.01); *C08L 33/14* (2013.01)

(58) Field of Classification Search
CPC ............ G02B 5/305; G01T 1/06; C08G 69/00
See application file for complete search history.

(56) References Cited

U.S. PATENT DOCUMENTS

| 5,886,359 A * | 3/1999 | Bringley ............... G01T 1/2018 250/370.09 |
| 7,767,143 B2 * | 8/2010 | Wendland ................. G01J 1/04 422/400 |
| 2004/0062682 A1 * | 4/2004 | Rakow ................... G01N 21/78 422/400 |
| 2004/0160538 A1 * | 8/2004 | Li ........................ C09K 19/544 349/16 |
| 2004/0184948 A1 * | 9/2004 | Rakow ................... G01N 21/45 422/1 |
| 2007/0246541 A1 * | 10/2007 | Patel ........................ G01T 1/06 235/487 |
| 2010/0055666 A1 * | 3/2010 | Wimberger-Friedl G01N 21/6454 435/4 |
| 2014/0335020 A1 * | 11/2014 | Basfar .................... A61K 49/00 424/9.1 |

(Continued)

OTHER PUBLICATIONS

Chiappelli, M. et al, "Photonic Multilayer Sensors from Photo-Crosslinkable Polymer Films", Advanced Materials, 2012, vol. 24, pp. 6100-6104.

(Continued)

*Primary Examiner* — Marcus Taningco
(74) *Attorney, Agent, or Firm* — Cantor Colburn LLP (57) ABSTRACT

A radiation sensor includes a substrate and a polymer multilayer film including alternating layers of a high refractive index polymer and a low refractive index polymer. The high refractive index polymer and the low refractive index polymer each comprise repeat units derived from a photo-crosslinkable monomer. The radiation sensors are useful in preparing various articles, including wearable patches, packaging materials, labels, and window panes. Also described is a method of detecting radiation using the radiation sensors.

20 Claims, 2 Drawing Sheets

(56) References Cited

U.S. PATENT DOCUMENTS

2015/0050214 A1* 2/2015 Basfar ............... A61K 49/0004
424/9.1

OTHER PUBLICATIONS

Ge, J. et al, "Responsive Photonic Crystals", Angewandte Chemie International Edition, 2011, vol. 50, pp. 1492-1522.
Jia, J. et al, "Photochemical Elimination of Leaving Groups from Zwitterionic Intermediates Generated via Electrocyclic Ring Closure of $\alpha,\beta$-Unsaturated Anilides", Journal of Organic Chemistry, 2008, vol. 73, pp. 8867-8879.
Laranjeira, J.M.G. et al "Polyaniline nanofilms as a sensing device for ionizing radiation" Physica E, 2003, vol. 17, pp. 666-667.
Lee, et al., "LET effect on cross-linking and scission mechanisms of PMMA during irradiation" Radiation Physics and Chemistry vol. 55 (1999) pp. 293-305.
Liu, Z. et al "A facile and convenient fluorescence detection of gamma-ray radiation based on the aggregation-induced emission", Journal of Materials Chemistry, 2011, vol. 21, pp. 14487-14491.
Mai, H. et al "Dyed polyvinyl chloride films for use as high-dose routine dosimeters in radiation processing", Radiation Physics and Chemistry, 2004, vol. 69, pp. 439-444.
Mai, H. et al "Polyvinyl butyral films containing leuco-malachite green as low-dose dosimeters", Radiation Physics and Chemistry, 2008, vol. 77, pp. 457-462.
Morehouse, K. et al "Irradiation of Food and Packaging: An Overview" ACS Symposium Series, 2004, pp. 1-11.
Nair, R. et al "Photonic crystal sensors: An overview", Progress in Quantum Electronics, 2010, vol. 34, pp. 89-134.
National Institute of Standards and Technology, [retrieved on Dec. 15, 2015]; retrieved from the Internet http://physics.nist.gov/PhysRefData/Star/Text/method.html. Berger, J. et al, "NIST ESTAR Database", 2005.
Schimitberger, et al. "X-ray dose detector based on color changing of light-emitting polymer-metal complex hybrid material" Sensors and Actuators B vol. 168 (2012), pp. 131-137.
Schimitberger, T. et al. "X-rays sensing properties of MEH-PPV, Alq3 and additive components: A new organic dosimeter as a candidate for minimizing the risk of accidents of patients undergoing radiation oncology" Med. Eng.& Phy., 2013, vol. 35, (5 pages).
Shultz, et al., "Radiation Degradation of Polymethacrylates. Dose Rate and Medium Effects" Journal of Polymer Science: Part A, vol. 1, pp. 1651-1669 (1963).
Soliman et al. A radiochromic film based on leucomalachite green for high-doese dosimetry applications; Radiation Measurements vol. 62, No. 45, 2014, (7 pages).
Woo, L. et al "Comparison of electron beam irradiation with gamma processing for medical packaging materials", Radiation Physics and Chemistry, 2002, vol. 63, pp. 845-850.
Zainuddin, et al., "Radiation-induced degradation and crosslinking of poly(ethylene oxide) in solid state" Journal of Radioanalystical and Nuclear Chemistry, vol. 253, No. 3 (2002), pp. 339-344.

* cited by examiner

PHOTONIC POLYMER MULTILAYERS FOR COLORIMETRIC RADIATION SENSING

STATEMENT REGARDING FEDERALLY SPONSORED RESEARCH & DEVELOPMENT

This invention was made with government support under Award No. HDTRA1-10-1-0099 awarded by the Defense Threat Reduction Agency. The government has certain rights in the invention.

BACKGROUND OF THE INVENTION

The ability to conveniently sense ionizing radiation is critical for a variety of applications including in medicine, defense, industrial food packaging, and pasteurization and sterilization techniques. Practical ranges for absorbed dose detection vary from the range of 1 Gy and below for human exposure, to upwards of hundreds of kGy for sterilization and decontamination procedures. See, e.g., K. M. Morehouse, V. Komolprasert, in *Irradiat. Food Packag.*, American Chemical Society, 2004, pp. 1-11. Colorimetric sensors are convenient and can offer both simple and accurate read-out. Many such detection techniques, however, rely on a change in optical density triggered by irradiation of a photo-sensitive chromophore and require external equipment for read-out in addition to stringent storage conditions to avoid device failure. See, e.g., G. Shani, *Radiation Dosimetry: Instrumentation and Methods*, CRC Press LLC, Boca Raton, Fla., 2001. Some solution-based sensors which show clear colorimetric changes spanning a broader range of the visible spectrum provide an attractive means towards convenient, stand-alone sensors, but utilize inconvenient and toxic organic solvents. See, e.g., T. Schimitberger, G. R. Ferreira, M. F. Saraiva, A. G. C. Bianchi, R. F. Bianchi, *Sensors Actuators B Chem.* 2012, 168, 131; Z. Liu, W. Xue, Z. Cai, G. Zhang, D. Zhang, *J. Mater. Chem.* 2011, 21, 14487; T. Schimitberger, G. R. Ferreira, L. C. Akcelrud, M. F. Saraiva, R. F. Bianchi, *Med. Eng. Phys.* 2013, 35, 140. Among the many existing approaches, film-based sensing techniques are appealing for general use because they avoid potentially toxic solvents, however may also require sealed containment or have time-sensitive restrictions on read-out due to a lack of chemical stability post-irradiation. See, e.g., H. H. Mai, N. D. Duong, T. Kojima, *Radiat. Phys. Chem.* 2004, 69, 439; H. H. Mai, H. M. Solomon, M. Taguchi, T. Kojima, *Radiat. Phys. Chem.* 2008, 77, 457; J. M. G. Laranjeira, H. J. Khoury, W. M. de Azevedo, E. A. de Vasconcelos, E. F. da Silva Jr., *Phys. E* 2003, 17, 666; Y. S. Soliman, A. A. Basfar, R. I. Msalam, *Radiat. Meas.* 2014, 62, 45.

One-dimensional photonic crystals are periodic multilayer structures that rely on the interference of light to reflect a characteristic wavelength defined by the refractive index and thickness of each layer. See, e.g., E. Born, M. Wolf, *Principles of Optics*, Cambridge University Press, Cambridge, United Kingdom, 2002. One-dimensional photonic sensors have been explored extensively for detection of a wide range of analytes, including pH, ionic strength, temperature and a variety of small molecules. See, e.g., J. Ge, Y. Yin, *Angew. Chem.* 2011, 50, 1492; R. V. Nair, R. Vijaya, *Prog. Quantum Electron.* 2010, 34, 89. For example, Hayward et al. (M. C. Chiappelli, R. C. Hayward, *Adv. Mater.* 2012, 24, 6100) developed an approach to photonic multilayers for colorimetric temperature sensing based on photo-crosslinkable polymers.

Accordingly, there remains a need for the development of low-cost and chemically stable colorimetric sensors based on crosslinked polymer multilayers for radiation sensing. The use of crosslinked polymer layers or films as a platform for radiation sensing would allow for straightforward colorimetric read-out due to the reliance on changes in structural color, rather than absorption or emission of light by a chromophore.

BRIEF SUMMARY OF EMBODIMENTS OF THE INVENTION

One embodiment is a radiation sensor comprising a substrate, a polymer multilayer film comprising alternating layers of a high refractive index polymer and a low refractive index polymer, wherein the high refractive index polymer comprises repeat units derived from a first photo-crosslinkable monomer, and wherein the low refractive index polymer consists of repeat units derived from a second photo-crosslinkable monomer and at least one monomer selected from the group consisting of $C_{1-12}$ alkyl (meth)acrylates, $C_{1-12}$ aryl (meth)acrylates, macromeric (meth)acrylates, (meth)acrylic acids, alpha olefins, vinyl esters, vinyl alkyl ethers, styrenic monomers, fluorinated monomers, and combinations thereof.

Another embodiment is an article comprising a radiation sensor, the radiation sensor comprising a substrate, a polymer multilayer film comprising alternating layers of a high refractive index polymer and a low refractive index polymer, wherein the high refractive index polymer and the low refractive index polymer each comprise repeat units derived from a photo-crosslinkable monomer, wherein the article is a wearable patch, a packaging material, a label, or a window pane.

Another embodiment is a method of detecting radiation, the method comprising exposing to ionizing radiation a radiation sensor comprising a substrate, a polymer multilayer film comprising alternating layers of a high refractive index polymer and a low refractive index polymer, wherein the high refractive index polymer and the low refractive index polymer each comprise repeat units derived from a photo-crosslinkable monomer; immersing the sensor in a solvent to swell the low refractive index layers, and monitoring the sensor for a change in color resulting from exposure to a dose of ionizing radiation.

These and other embodiments are described in detail below.

DETAILED DESCRIPTION OF THE INVENTION

The present inventors have discovered a new approach for colorimetric sensing of ionizing radiation based on photonic polymer multilayer films Upon immersion in a solvent, the multilayers give rise to reflected structural color in the visible region of the spectrum, with a coloration that depends on the degree of swelling of the low refractive index polymer layers. Exposure to ionizing radiation leads to either preferential degradation or crosslinking of the low refractive index polymer, yielding a change in color in the swelled state. The operation of both red- and blue-shifting colorimetric sensors is demonstrated. This approach further allows for the preparation of sensors on flexible plastic substrates.

One aspect of the present disclosure is a radiation sensor comprising a substrate and a polymer multilayer film.

The substrate can be any suitable material capable of providing support for the polymer multilayer film of the radiation sensors. The substrate can be flexible or non-flexible (e. g., rigid), and can be tailored to suit a given application. The substrate can be a flat surface. The substrate can be, for example, a polymer film, a glass substrate, an inorganic substrate, a ceramic substrate, a silicon wafer, a fabric sheet, or any combination thereof. In an exemplary embodiment, the substrate is a glass substrate. In some embodiments, a flexible substrate is preferred. For example, the flexible substrate can be a polymer film, for example a poly(ethylene terephthalate) (PET) substrate. The substrate can have a thickness that varies depending on a given application, and generally can have any desired thickness. For example, the substrate can have a thickness of at least about 50 micrometers ($\mu$m), for example about 50 $\mu$m to about 25 millimeters (mm).

The radiation sensor comprises a polymer multilayer film. The polymer multilayer film comprises alternating layers of a high refractive index polymer and a low refractive index polymer. The polymer multilayer film can comprise at least 2 to 50 alternating layers, for example, 4 to 25 alternating layers, for example 5 to 15 alternating layers. Each layer can have a thickness of 0.01 to 0.5 micrometers ($\mu$m), for example 0.01 to 0.2 $\mu$m, for example, 0.05 to 0.1 $\mu$m. The thickness of the layers can be selected so as to reflect a particular wavelength of light. For example, the thickness of the layers can be chosen to reflect blue-violet light in the dry state and undergo a red shift due to swelling of the low refractive index layers upon immersion in a mild, non-toxic solvent. In some embodiments, no additional reflective layers are included in the radiation sensor, for example, additional reflective layers (e.g., layers comprising metals or semi-metals, alloys, metal oxides, and combinations thereof) can be excluded from the radiation sensor.

The high refractive index polymer layer comprises a high refractive index polymer, and can have a refractive index of greater than 1.5, for example the refractive index can be 1.51 to 1.8, or 1.55 to 1.75, or 1.55 to 1.65. The high refractive index polymer can comprise repeat units derived from, for example, styrenic monomers, halogenated monomers, sulfur-containing monomers, phosphorus-containing monomers, ferrocenylsilanes, monomers having aromatic components, and the like. Styrenic monomers can include, for example, styrene, halogen-substituted styrenes, and $C_{1-6}$ alkyl-substituted styrenes (e.g., para-methylstyrene). Halogenated monomers can include monomers containing at least one halogen-carbon bond.

The high refractive index polymer further comprises repeat units derived from a first photo-crosslinkable monomer. The first photo-crosslinkable monomer can include a photo-crosslinkable group. Photo-crosslinkable groups include compounds that are sensitive to radiation, for example ultraviolet (UV) radiation. For example, photo-crosslinkable groups can include, but are not limited to, compounds such as diphenylmethanone (benzophenone), 1-(4-hydroxyphenyl)-2,2-dimethoxyethanone, 1-[4-(2-hydroxyethyl)phenyl]-2,2-dimethoxyethanone, (4-isocyanatophenyl)-2,2-dimethoxy-2-phenylethanone, 1-{4-[2-(2,3-epoxypropoxy)phenyl]}-2,2-dimethyl-2-hydroxyethanone, 1-[4-(2-aminoethoxy)phenyl]-2,2-dimethoxyethanone, and 1-[4-(carbomethoxy)phenyl]-2,2-dimethoxyethanone, phenyl azide, benzyl azide, and the like. In an exemplary embodiment, the photo-crosslinkable group can be a benzophenone (BP) group. In a specific embodiment, the high refractive index polymer can comprise repeat units derived from a styrenic monomer and the first photo-crosslinkable monomer. For example, the high refractive index polymer can comprise repeat units derived from para-methylstyrene and the first photo-crosslinkable monomer comprising a benzophenone group. The first photo-crosslinkable monomer can be present in the high refractive index polymer in an amount of 0.1 to 25 mole percent (mol %), for example, 0.5 to 20 mol %, for example, 1 to 10 mol %, for example 2 to 5 mol %.

The high refractive index polymers can be prepared according to methods which are generally known, for example, using free radical polymerization techniques. There are no particular restrictions on the molecular weight of the high refractive index polymer. For example the number average molecular weight of the high refractive index polymer can be 1,000 to 100,000 Daltons (Da), for example 10,000 to 50,000 Da, for example 20,000 to 40,000 Da, as determined using gel permeation chromatography (GPC).

The low refractive index polymer layer comprises a low refractive index polymer, and has a refractive index that is lower than the refractive index of the high refractive index polymer layer. The low refractive index polymer layer can have a refractive index of less than or equal to 1.5, for example the refractive index can be 1.3 to 1.5, for example, 1.4 to 1.5. There is no minimum difference required between the refractive indices of the high refractive index polymer layer and the low refractive index polymer layer, so long as a clear color shift can be observed in the sensor following exposure to ionizing radiation. The number of alternating layers included in the polymer multilayer film can also be adjusted to obtain a clear color shift. The low refractive index polymer can comprise repeat units derived from, for example, $C_{1-12}$ alkyl (meth)acrylates, $C_{1-12}$ aryl (meth)acrylates, macromeric (meth)acrylates, (meth)acrylic acids, alpha olefins, vinyl esters, vinyl alkyl ethers, styrenic monomers, fluorinated monomers, and combinations thereof. $C_{1-12}$ alkyl (meth)acrylates and $C_{1-12}$ aryl (meth)acrylates can include, for example, methyl (meth)acrylate, ethyl (meth)acrylate, n-butyl (meth)acrylate, t-butyl (meth)acrylate, hexyl (meth)acrylate, isooctyl (meth)acrylate, 2-ethylhexyl (meth)acrylate, phenoxyethyl (meth)acrylate, and the like. (Meth)acrylic acids can include, for example, methacrylic acid, acrylic acid, and alkali metal salts of (meth) acrylic acids. Fluorinated monomers can include monomers having at least one fluorine-carbon bond, for example, tetrafluoroethylene, hexafluoropropylene, perfluoro $C_{1-12}$ alkyl (meth)acrylates, and vinylidene fluoride. Macromeric (meth)acrylates can be (meth)acrylate-terminated oligomers, and can include, for example, (meth)acrylate-terminated styrene oligomers, (meth)acrylate-terminated siloxane oligomers, and (meth)acrylate-terminated polyethers (e.g., oligoethylene glycol (meth)acrylates). A "(meth)acrylate-terminated" oligomer is generally understood to be an oligomer having at least one (meth)acrylate end-group, wherein the oligomer can have a molecular weight of, for example, less than or equal to 1,000 Da. In some embodiments, the low refractive index polymer can comprise repeat units derived from oligoethylene glycol methacrylate, methyl methacrylate, and combinations thereof.

The low refractive index polymer further comprises repeat units derived from a second photo-crosslinkable monomer. The second photo-crosslinkable monomer can be the same or different as the first photo-crosslinkable monomer, described above. In an exemplary embodiment, the second photo-crosslinkable monomer can comprise a benzophenone (BP) group. The second photo-crosslinkable monomer can be present in the low refractive index polymer in an amount of 0.1 to 25 mole percent (mol %), for example, 0.5 to 20 mol %, for example, 1 to 10 mol %, for example 2 to 5 mol %.

In a specific embodiment, the low refractive index polymer can consist of repeat units derived from a second photo-crosslinkable monomer and at least one monomer selected from the group consisting of $C_{1-12}$ alkyl (meth)acrylates, $C_{1-12}$ aryl (meth)acrylates, macromeric (meth)acrylates, (meth)acrylic acids, alpha olefins, vinyl esters, vinyl alkyl ethers, styrenic monomers, fluorinated monomers, and combinations thereof. For example, the low refractive index polymer can consist of repeat units derived from a second photo-crosslinkable monomer comprising a benzophenone group, and at least one monomer selected from the group consisting of oligoethylene glycol methacrylate, methyl methacrylate, and combinations thereof.

The low refractive index polymers can be prepared according to methods which are generally known, for example, using free radical polymerization techniques. There are no particular restrictions on the molecular weight of the low refractive index polymer. For example the number average molecular weight ($M_n$) of the low refractive index polymer can be 1,000 to 100,000 Daltons (Da), for example 10,000 to 60,000 Da, for example, 25,000 to 50,000 Da, as determined using gel permeation chromatography (GPC).

The radiation sensors can be prepared by sequentially solution-coating, crosslinking, and developing the high and low refractive index layers, generating the polymer multilayer film. Forming the layers by solution-coating can include methods such as solvent casting, spin coating, drop casting, ink jetting, doctor blading, dip coating, and the like. A first layer can be directly solution-cast on the substrate, and a second layer can be disposed directly on the first layer. The process of solution-coating, crosslinking, and developing can be repeated until the desired number of alternating layers is obtained. The polymer layers can be crosslinked using, for example, a UV light source to activate the photo-crosslinkable monomers. For example, a 365 nanometer UV light source with a dose of about 80 joules per centimeter$^2$ (J/cm$^2$) can be used to crosslink the layers when the photo-crosslinkable monomer comprises a benzophenone group.

An article comprising the radiation sensors represents another aspect of the present disclosure. For example, the radiation sensors can be particularly useful for use in articles including wearable patches, packing materials, indicating labels, vehicle components (e.g., a window pane), and components of housing or other types of shelter (e.g., a window pane).

The radiation sensors of the present disclosure can be useful for detecting ionizing radiation. Ionizing radiation can include electron beam, gamma ray, and X-ray radiation. Upon exposing the radiation sensors to ionizing radiation, the low refractive index polymer layers can undergo crosslinking, degradation, or a combination thereof, depending on the chemical structure of the low refractive index polymer. Following exposure to the ionizing radiation, the sensors can be exposed to a solvent suitable for swelling the low refractive index polymer layers. The solvent can be selected so as to swell the low refractive index polymer layer, and further be a non-solvent for the high refractive index polymer layer. Therefore selection of a solvent will depend on the chemical structure of the polymers present in each layer. The solvent for swelling the low refractive index layers can include, for example, water, alcohol-containing solvents (e.g., methanol, ethanol, isopropanol, and the like), and combinations thereof. It is generally preferred that the high refractive index polymer layers do not swell upon immersion in the solvent and thus do not contribute to the observed shift in the wavelength of the reflected light.

The degree of swelling of the irradiated regions can increase or decrease, depending on the chemical structure of the low refractive index polymers, thereby causing a shift in the reflectance peak compared to the unexposed regions of the sample. For example, a radiation sensor including a low refractive index polymer that preferentially undergoes crosslinking upon exposure to ionizing radiation can exhibit a 5 to 300 nanometer blue shift in the wavelength of reflected light following exposure to a dose of ionizing radiation. Alternatively, a radiation sensor including a low refractive index polymer that preferentially undergoes degradation upon exposure to ionizing radiation can exhibit a 5 to 300 nanometer red shift in the wavelength of reflected light following exposure to a dose of ionizing radiation. The dose of ionizing radiation can be greater than 0 to 400 kilogray, for example 1 to 400 kilogray, for example 10 to 400 kilogray, for example 25 to 400 kilogray.

In one embodiment, the radiation sensor can include a low refractive index polymer layer having repeat units derived from oligoethylene glycol methacrylate and a photo-crosslinkable monomer comprising a benzophenone group. In this embodiment, the radiation sensor can exhibit a 5 to 300 nanometer, for example a 5 to 100 nanometer, blue shift in the wavelength of reflected light observed at normal incidence of an irradiated region of the sensor upon swelling the low refractive index polymer layers following exposure to a dose of ionizing radiation of greater than 0 to 400 kilogray. The solvent for swelling the low refractive index layers in this embodiment can be, for example, ethanol. In this embodiment, the high refractive index polymer layers do not swell upon immersion in the solvent (e.g., ethanol) and thus do not contribute to the observed shift in the wavelength of the reflected light.

In another embodiment, the radiation sensor can include a low refractive index polymer layer having repeat units derived from methyl methacrylate and a photo-crosslinkable monomer comprising a benzophenone group. In this embodiment, the radiation sensor can exhibit a 5 to 300 nanometer, for example a 5 to 100 nanometer, red shift in the wavelength of reflected light observed at normal incidence of an irradiated region of the sensor upon swelling the low refractive index polymer layers following exposure to a dose of ionizing radiation of greater than 0 to 400 kilogray. The solvent for swelling the low refractive index layers in this embodiment can be, for example, ethanol. In this embodiment, the high refractive index polymer layers do not swell upon immersion in the solvent (e.g., ethanol) and thus do not contribute to the observed shift in the wavelength of the reflected light.

A method of detecting radiation represents an additional aspect of the present disclosure. The method can include exposing the radiation sensor to ionizing radiation, immersing the sensor in a solvent to swell the low refractive index layers, and monitoring the sensor for a change in color resulting from exposure to a dose of ionizing radiation. The dose of ionizing radiation can be greater than 0 to 400 kilogray, for example, 1 to 400 kilogray, for example 10 to 400 kilogray, for example 25 to 400 kilogray. The change in color can depend on the structure of the polymer selected for the low refractive index layer. For example, the radiation sensor can exhibit a 5 to 300 nanometer shift in the wavelength of reflected light. The shift in the wavelength of reflected light can be a red shift or a blue shift.

The invention includes at least the following embodiments.

Embodiment 1

A radiation sensor comprising, a substrate; a polymer multilayer film comprising alternating layers of a high refractive index polymer and a low refractive index polymer; wherein the high refractive index polymer comprises repeat units derived from a first photo-crosslinkable monomer; and wherein the low refractive index polymer consists of repeat units derived from a second photo-crosslinkable monomer and at least one monomer selected from the group consisting of $C_{1-12}$ alkyl (meth)acrylates, $C_{1-12}$ aryl (meth)acrylates, macromeric (meth)acrylates, (meth)acrylic acids, alpha olefins, vinyl esters, vinyl alkyl ethers, styrenic monomers, fluorinated monomers, and combinations thereof.

Embodiment 2

The radiation sensor of embodiment 1, wherein the substrate is glass.

Embodiment 3

The radiation sensor of embodiment 1, wherein the substrate is a flexible substrate.

Embodiment 4

The radiation sensor of embodiment 3, wherein the flexible substrate is a poly(ethylene terephthalate) substrate.

Embodiment 5

The radiation sensor of any of embodiments 1 to 4, wherein the polymer multilayer film comprises at least 2 to 50 alternating layers.

Embodiment 6

The radiation sensor of any of embodiments 1 to 5, wherein the high refractive index polymer layers and the low refractive index polymer layers each independently have thicknesses of 0.01 to 0.2 micrometers.

Embodiment 7

The radiation sensor of any of embodiments 1 to 6, wherein the high refractive index polymer has a refractive index greater than 1.5.

Embodiment 8

The radiation sensor of any of embodiments 1 to 7, wherein the high refractive index polymer further comprises repeat units derived from para-methylstyrene.

Embodiment 9

The radiation sensor of any of embodiments 1 to 8, wherein the low refractive index polymer has a refractive index less than or equal to 1.5.

Embodiment 10

The radiation sensor of any of embodiments 1 to 9, wherein the low refractive index polymer consists of repeat units derived from a photo-crosslinkable monomer and at least one monomer selected from the group consisting of oligoethylene glycol methacrylate, methyl methacrylate, and combinations thereof.

Embodiment 11

The radiation sensor of any of embodiments 1 to 10, wherein the first and second photo-crosslinkable monomers each comprise a benzophenone group.

Embodiment 12

The radiation sensor of any of embodiments 1 to 11, wherein the high refractive index polymer comprises 1 to 10 mole percent of the first photo-crosslinkable monomer, and the low refractive index polymer comprises 1 to 10 mole percent of the second photo-crosslinkable monomer.

Embodiment 13

The radiation sensor of any of embodiments 1 to 2 or 5 to 12, wherein the substrate is glass; the high refractive index polymer comprises repeat units derived from para-methylstyrene and a first photo-crosslinkable monomer; the low refractive index polymer consists of repeat units derived from a second photo-crosslinkable monomer and at least one monomer selected from the group consisting of oligoethylene glycol methacrylate, methyl methacrylate, and combinations thereof; and the first and second photo-crosslinkable monomers each comprise a benzophenone group.

Embodiment 14

The radiation sensor of any of embodiments 1 or 3 to 12, wherein the support substrate is a flexible support substrate comprising poly(ethylene terephthalate); the high refractive index polymer comprises repeat units derived from para-methylstyrene and a photo-crosslinkable monomer; the low refractive index polymer consists of repeat units derived from a photo-crosslinkable monomer and at least one monomer selected from the group consisting of oligoethylene glycol methacrylate, methyl methacrylate, or a combination thereof; and the first and second photo-crosslinkable monomers each comprise a benzophenone group.

Embodiment 15

The radiation sensor of any of embodiments 1 to 14, wherein the low refractive index polymer consists of repeat units derived from oligoethylene glycol methacrylate and the second photo-crosslinkable monomer comprising a benzophenone group; and wherein a 5 to 100 nanometer blue shift in the wavelength of reflected light of an irradiated region of the sensor occurs upon swelling the low refractive index polymer layers following exposure to a dose of ionizing radiation of greater than 0 to 400 kilogray.

Embodiment 16

The radiation sensor of any of embodiments 1 to 14, wherein the low refractive index polymer consists of repeat units derived from methyl methacrylate and the first photo-crosslinkable monomer comprising a benzophenone group; and wherein a 5 to 100 nanometer red shift in the wavelength of reflected light of an irradiated region of the sensor occurs upon swelling the low refractive index polymer layers following exposure to a dose of ionizing radiation of greater than 0 to 400 kilogray.

Embodiment 17

An article comprising a radiation sensor, the radiation sensor comprising, a substrate; a polymer multilayer film comprising alternating layers of a high refractive index polymer and a low refractive index polymer; and wherein the high refractive index polymer and the low refractive index polymer each comprise repeat units derived from a photo-crosslinkable monomer.

Embodiment 18

The article of embodiment 17, wherein the article is a wearable patch, a packaging material, a label, or a window pane.

Embodiment 19

A method of detecting radiation, the method comprising, exposing to ionizing radiation a radiation sensor comprising, a substrate; a polymer multilayer film comprising alternating layers of a high refractive index polymer and a low refractive index polymer; wherein the high refractive index polymer and the low refractive index polymer each comprise repeat units derived from a photo-crosslinkable monomer; immersing the sensor in a solvent to swell the low refractive index layers; and monitoring the sensor for a change in color resulting from exposure to a dose of ionizing radiation.

Embodiment 20

The method of embodiment 19, wherein the dose of ionizing radiation is greater than 0 to 400 kilogray.

Embodiment 21

The method of any of embodiments 19 to 20, wherein the high refractive index polymer comprises repeat units derived from para-methylstyrene and a photo-crosslinkable monomer comprising benzophenone; the low refractive index polymer comprises repeat units derived from oligoethylene glycol methacrylate, methyl methacrylate, or a combination thereof and a photo-crosslinkable monomer comprising benzonphenone; the solvent comprises ethanol; and the change in color is a shift in the wavelength of reflected light of about 5 to 300 nanometers.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety, including priority application 62/069,909 filed Oct. 29, 2014. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

As used herein, the term "alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—($CH_2$)$_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$— and —$C_nH_{2n-2x}$— wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g, benzyl), C$_{7-12}$ alkylarylene (e.g, toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

The invention is further illustrated by the following non-limiting examples.

Examples

The approach to colorimetric radiation sensors disclosed herein is based on one dimensional photonic multilayers fabricated by spin-coating, photo-crosslinking, and developing of alternating layers of a high refractive index polymer, poly(para-methylstyrene) (P(p-MS-BP)) and one of two different low refractive index polymers. The layer thicknesses were chosen to reflect blue-violet light in the dry state and undergo a red-shift due to swelling of the low refractive index layers upon immersion in a mild, non-toxic solvent (in this case, ethanol). Depending on their chemical structure, polymers tend to undergo either preferential crosslinking or degradation under ionizing radiation. See, e.g., A. Chapiro, *Radiation Chemistry of Polymeric Systems*, John Wiley & Sons, Inc., London, 1962. Thus, upon irradiation of the multilayers, the degree of swelling of the irradiated regions will either increase or decrease, depending on the chemical structure of the low-index layers, thereby causing a shift in the reflectance peak compared to the unexposed regions of the sample.

Figure 1:
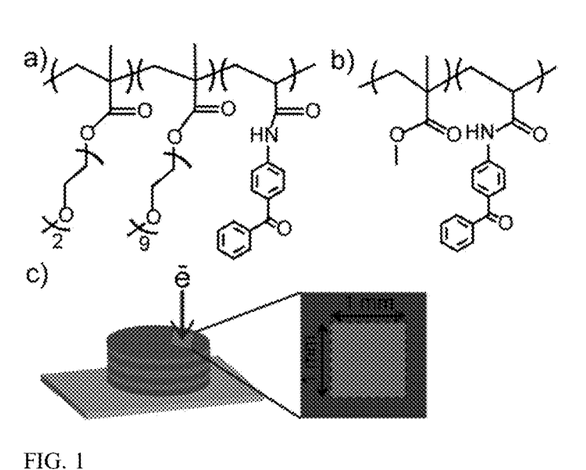
FIG. 1 shows the chemical structures of responsive materials (a) P(OEGMA-BP) and (b) P(MMA-BP) and (c) a schematic of multilayer radiation exposure setup and dimensions.

Two radiation sensor systems were designed based on polymers expected to undergo radiation-induced crosslinking or degradation, respectively, poly(oligoethylene glycol methacrylate-benzophenone) (P(OEGMA-BP)) (FIG. 1a) and poly(methyl methacrylate-benzophenone) (P(MMA-BP)) (FIG. 1b). The materials were copolymerized with 2-5 mole percent (mol %) of the photo-crosslinkable monomer including a benzophenone (BP) group to allow for UV crosslinking during multilayer fabrication. Mid-chain carbon-centered radicals on poly(ethylene oxide) (PEO) irradiated in vacuo are known to predominantly undergo crosslinking via radical recombination, particularly above 15 kGy, consistent with the dose range of our study. See, e.g., A. Chapiro, *Radiation Chemistry of Polymeric Systems*, John Wiley & Sons, Inc., London, 1962; Zainuddin, J. Albinska, P. Ulański, J. M. Rosiak, *J. Radioanal. Nucl. Chem.* 2002, 253, 339. Poly(methyl methacrylate) (PMMA) is a well-known positive resist for ion and electron beam lithography due to its degradation upon irradiation via main chain scission. See, e.g., A. Chapiro, *Radiation Chemistry of Polymeric Systems*, John Wiley & Sons, Inc., London, 1962; A. R. Shultz, P. I. Roth, J. M. Berge, *J. Polym. Sci. A* 1963, 1, 1651; E. H. Lee, G. R. Rao, L. K. Mansur, *Radiat. Phys. Chem.* 1999, 55, 293. PMMA films have been shown to preferentially degrade under ionizing radiation in vacuo at kGy doses comparable to the dose ranges examined in the present work.

Figure 2:
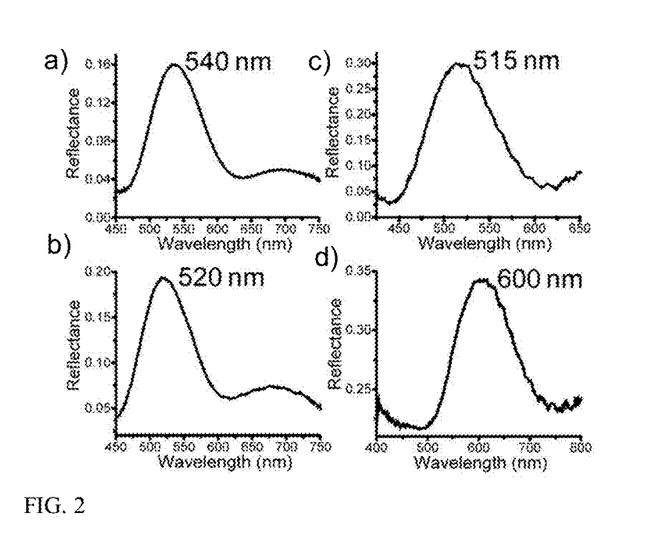
FIG. 2 shows reflectance spectra of swelled multilayers after exposure to radiation. A preferentially crosslinking system shows a (b) blue shift compared to the unexposed areas (a), and a preferentially degrading system shows a (d) red shift from the unexposed areas (c).
Figure 3:
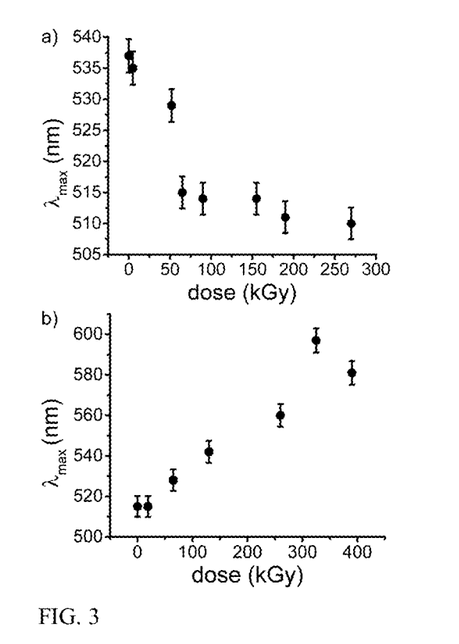
FIG. 3 shows a change in peak wavelength of reflected light with increasing radiation dose demonstrating a blue-shift for (a) a preferentially crosslinking sensor and a red-shift for (b) a preferentially degrading sensor. The error bars represent estimated uncertainties in $\lambda_{max}$ from multiple measurements of reflectivity for a given sensor exposed to the specified dose, (a)±0.5% and (b)±1.0%.

Upon exposure to ionizing radiation in the form of an electron beam, additional crosslinks were introduced to the P(OEGMA-BP)-containing sensors, leading to a decrease in the degree of swelling and subsequently a blue shift in the wavelength of reflectance peak of the irradiated region upon swelling in ethanol (FIG. 2a-b). This effect was evident in a ~30 nm blue shift in the reflectance spectra over exposures from 0 to 270 kGy. Conversely, irradiation induces dislinking in the P(MMA-BP) layers, leading to an increase in the degree of swelling and thus a red shift in the wavelength of reflected light. This effect was evident in a ~75 nm red shift for samples swelled in ethanol after irradiation with a dose of 325 kGy (FIG. 2c-d). FIG. 3 shows the full range of sensitivity for P(OEGMA-BP) and P(MMA-BP)-containing sensors which display an increasing blue or red shift, respectively, in the wavelength of reflected light with increasing radiation dose. Preferentially crosslinking P(OEGMA-BP)-containing sensors show a sharp linear decrease in $\lambda_{max}$ at doses up to approximately 50 kGy, after which there is a more gradual blue shift of $\lambda_{max}$ with increasing dose. We observed an approximately linear dependence of $\lambda_{max}$ with increasing dose for preferentially degrading PMMA-containing sensors. We noted that the P(p-MS-BP) layers likely undergo additional radiation-induced crosslinking, based on previous findings showing that para-substituted polystyrenes tend to crosslink under ionizing radiation, presumably due to crosslinking via hydrogen abstraction from the para-position. However, ethanol is a non-solvent for P(p-MS-BP) and therefore these layers do not swell upon immersion in ethanol and thus do not contribute to the observed shift in reflectance.

While the dose ranges for noticeable colorimetric changes are relatively high, they are comparable to commercial ion beam dosimetry systems, including radiochromic film systems GafChromic HD-V2, Far West Technology FWT-60 and cellulose triacetate Fujifilm FTR-125, with sensitivities of single to hundreds of kGy. Such photonic sensors can thus provide a new route towards simple and environmentally stable radiation dosimeters for food, packaging, and medical device sterilization techniques, which rely upon monitoring doses in the kGy-range. See, e.g., V. Komolprasert, in *Packag. Non Therm. Process. Food*, Blackwell Publishing, 2007; L. Woo, C. L. Sandford, *Radiat. Phys. Chem.* 2002, 63, 845. Improvements in sensitivity by roughly an order of magnitude can easily be envisioned by increasing the molecular weight between crosslinks in the low index layers, while further improvements through optimization of the copolymer chemistry can also be anticipated. For example, copolymerization with methacrylic acid is known to increase the sensitivity of PMMA-containing photoresists substantially, and a similar strategy could be employed here to improve the sensitivity of preferentially dislinking sensors. See, e.g., P. Rai-Choudhry, Ed., *SPIE Handbook of Microlithography, Micromachining, and Microfabrication: Volume 1*, SPIE Press, 1997.

Figure 4:
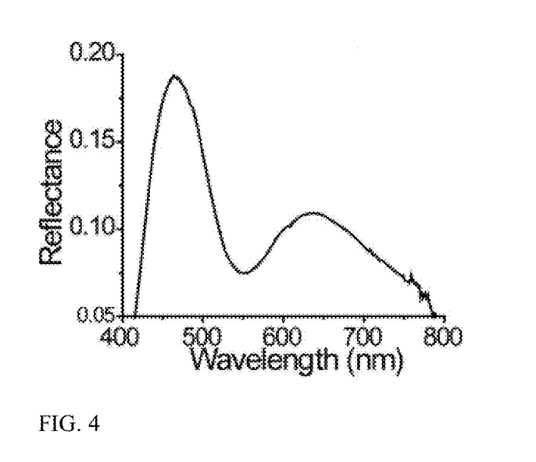
FIG. 4 shows the reflectance spectrum of a 7-layer flexible sensor fabricated on a Mylar sheet.

These multilayers can be effectively fabricated on flexible substrates of transparent, biaxially-oriented polyethylene terephthalate (Mylar) sheets (FIG. 4). These sensors were found to maintain their structural integrity and function even after multiple swelling/de-swelling cycles. The ability to prepare these sensors on flexible substrates allows for use in a variety of applications, for example, as wearable patches, or in packaging applications.

Described herein is a new approach to colorimetric radiation sensing based on photonic polymer multilayers. Preferential degradation or crosslinking of the low-index polymer layers alters the degree of swelling of the irradiated region, thereby providing a colorimetric read-out of the exposed dose. The sensitivity of the above-described devices is in the 100 kGy range. Further refinements to the copolymers used will enable substantial improvements in sensitivity. Furthermore, the process allows for the preparation of robust multilayers on polymer substrates, offering the possibility to prepare flexible sensors.

Experimental Details Follow.

Materials.

Azobisisobutyronitrile (AIBN) was obtained from Aldrich, and was recrystallized from methanol. Acrylamidobenzophenone (BP) monomer was prepared according to a previously reported literature procedure via reaction of acryloyl chloride and 4-aminobenzophenone. J. Jia, M. Sarker, M. G. Steinmetz, R. Shukla, R. Rathore, *J. Org. Chem.* 2008, 73, 8867. P-methylstyrene (p-MS) was obtained from Acros Organics and inhibitor was removed prior to use by passing through a column of basic alumina 2-(2-methoxyethoxy) ethyl methacrylate ($MEO_2MA$), oligoethylene glycol methyl ether methacrylate (OEGMA, $M_n$=475 Da), and methyl methacrylate (MMA) were obtained from Aldrich. MMA was purified by washing with saturated sodium bicarbonate solution (three times) and drying over sodium sulfate. Glass substrates were cleaned and treated with methacryloxypropyl trichlorosilane, obtained from Gelest. Flexible Mylar (polyethylene terephthalate, PET) substrates were obtained from McMaster-Carr.

Characterization.

Proton nuclear magnetic resonance ($^1$H NMR) spectroscopy was performed using a Bruker DPX 300 spectrometer. A Magellan 400 scanning electron microscope was used for all radiation exposure experiments.

Polymers were synthesized by conventional free radical polymerization using azobisisobutyronitrile (AIBN) as initiator.

Synthesis of poly(para-methylstyrene)-co-(acrylamidobenzophenone) (P(p-MS-BP))

The monomers p-MS (3 milliliters, 23 millimoles) and BP (0.45 g, 1.8 millimoles) were polymerized in 30 milliliters of 1,4-dioxane at 80° C. for 15 hours under nitrogen following three freeze-pump-thaw cycles, resulting in a random copolymer containing 10 mole percent of BP. The copolymer was purified by precipitation into methanol, washed under vacuum filtration and dried overnight in a vacuum oven at 20° C. prior to use. The structure was confirmed by $^1$H NMR spectroscopy. Gel permeation chromatography (GPC) in tetrahydrofuran (THF) against poly(methyl methacrylate) (PMMA) standards was used for molecular weight characterization of the polymer ($M_n$=30,000 Da).

Synthesis of poly(oligoethylene glycol methyl ether methacrylate)-co-(acrylamidobenzophenone) (P(OEGMA-BP))

2-(2-Methoxyethoxy) ethyl methacrylate ($MEO_2MA$) (2 milliliters, 11 millimoles), oligoethylene glycol methyl ether methacrylate (OEGMA, Mn=475 Da) (251 milliliters, 570 millimoles), BP (58 milligrams, 0.23 millimoles) and AIBN (3.4 milligrams, 0.02 millimoles) were polymerized in a 5:1 mixture of ethanol:1,4-dioxane at 80° C. for 18 hours under nitrogen following three freeze-pump-thaw cycles, resulting in a random copolymer containing 2 mole percent of BP. The polymer was purified by dialysis against a 5:1 mixture of ethanol:1,4-dioxane at 20° C., followed by lyophilization, and its structure confirmed by $^1$H NMR spectroscopy. Gel permeation chromatography (GPC) in tetrahydrofuran (THF) against poly(methyl methacrylate) (PMMA) standards was used for molecular weight characterization of the polymer ($M_n$=50,000 Da).

Synthesis of poly(methyl methacrylate)-co-(acrylamidobenzophenone) (P(OEGMA-BP))

MMA (2 grams, 20 millimoles), BP (0.25 grams, 1 millimole), and AIBN (8.2 milligrams, 0.05 millimoles) were dissolved in 10 milliliters of 1,4-dioxane and sparged with nitrogen gas for 30 minutes before heating the reaction mixture to 85° C. The reaction mixture was stirred for 48 hours and purified by precipitation into methanol, yielding a copolymer containing 5 mole percent BP, determined using $^1$H NMR spectroscopy. Gel permeation chromatography (GPC) in tetrahydrofuran (THF) against poly(methyl methacrylate) (PMMA) standards was used for molecular weight characterization of the polymer ($M_n$=25,000 Da).

Sensor Preparation and Characterization.

Photonic multilayers were prepared by sequential spin-coating, crosslinking and developing of polymer films as is generally known (M. C. Chiappelli, R. C. Hayward, *Adv. Mater.* 2012, 24, 6100). Glass substrates were first cleaned by sonication for 10 minutes each in acetone, ethanol and water followed by surface treatment with methacryloxypropyl trichlorosilane to promote substrate-polymer adhesion. Flexible Mylar substrates were used as received and cleaned by rinsing with water, acetone and ethanol. P(p-MS-BP) and P(OEGMA-BP) were cast from toluene, while P(MMA-BP) was cast from cyclohexanone. Developing solutions for the three respective copolymers were 1:0.65 toluene:hexanes, 1:0.53 toluene:hexanes, and chloroform. Polymer films were crosslinked using a Newport 365 nanometer (nm) ultraviolet (UV) light source, with a typical dose of approximately 80 joules per centimeter$^2$ (J/cm$^2$), which is sufficient to fully convert the BP photo-crosslinkers. A Magellan 400 scanning electron microscope was used for all radiation exposure. As-prepared multilayers were exposed to electron beam radiation by scanning a 1 millimeter (mm)×1 mm square at 150× magnification with fixed accelerating voltage of 15 kilovolts (kV), and current of 1.6 nanoampere (nA). At 15 kV, the excitation volume depth for all three polymers is in the micrometer range. Therefore, we can assume that all layers are excited and the electron beam penetrates the entire thickness of the multilayer sensors, which are approximately 0.5 µm in total thickness. The radiation dose was varied by adjusting exposure time t, and was quantified in terms of the approximate absorbed dose according to:

$$\text{dose} = \frac{I * S * t}{A} \quad \text{(Eq. 1)}$$

where I is the current, S the stopping power, and A the exposure area. Values for stopping power for 15 keV kinetic energy electrons were calculated using the NIST ESTAR database based on the chemical compositions of the polymers, yielding an average value for P(p-MS-BP), P(OEGMA-BP) and P(MMA-BP) of 16 MeV cm$^2$/g, which was used to estimate absorbed doses. J. Berger, M. J. Coursey, J. S. Zucker, M. A. Chang, "NIST ESTAR Database," can be found under http://physics.nist.gov/PhysRef- Data/Star/Text/method.html, 2005. The response of irradiated samples was determined by swelling in ethanol and acquiring reflectance spectra in situ using a reflectance probe (Semiconsoft MProbe) integrated with an upright microscope (Zeiss Axiotech). The microscope aperture was adjusted to ensure that the measured area fell entirely within the irradiated square.

The invention claimed is:

1. A radiation sensor comprising,
a substrate;
a polymer multilayer film comprising alternating layers of a high refractive index polymer and a low refractive index polymer;
wherein the high refractive index polymer comprises repeat units derived from a first photo-crosslinkable monomer; and
wherein the low refractive index polymer consists of repeat units derived from a second photo-crosslinkable monomer and at least one monomer selected from the group consisting of $C_{1-12}$ alkyl (meth)acrylates, $C_{1-12}$ aryl (meth)acrylates, macromeric (meth)acrylates, (meth)acrylic acids, alpha olefins, vinyl esters, vinyl alkyl ethers, styrenic monomers, fluorinated monomers, and combinations thereof.

2. The radiation sensor of claim 1, wherein the substrate is glass.

3. The radiation sensor of claim 1, wherein the substrate is a flexible substrate.

4. The radiation sensor of claim 3, wherein the flexible substrate is a poly(ethylene terephthalate) substrate.

5. The radiation sensor of claim 1, wherein the polymer multilayer film comprises at least 2 to 50 alternating layers.

6. The radiation sensor of claim 1, wherein the high refractive index polymer layers and the low refractive index polymer layers each independently have thicknesses of 0.01 to 0.2 micrometers.

7. The radiation sensor of claim 1, wherein the high refractive index polymer has a refractive index greater than 1.5.

8. The radiation sensor of claim 1, wherein the high refractive index polymer further comprises repeat units derived from para-methylstyrene.

9. The radiation sensor of claim 1, wherein the low refractive index polymer has a refractive index less than or equal to 1.5.

10. The radiation sensor of claim 1, wherein the low refractive index polymer consists of repeat units derived from a photo-crosslinkable monomer and at least one monomer selected from the group consisting of oligoethylene glycol methacrylate, methyl methacrylate, and combinations thereof.

11. The radiation sensor of claim 1, wherein the first and second photo-crosslinkable monomers each comprise a benzophenone group.

12. The radiation sensor of claim 1, wherein the high refractive index polymer comprises 1 to 10 mole percent of the first photo-crosslinkable monomer, and the low refractive index polymer comprises 1 to 10 mole percent of the second photo-crosslinkable monomer.

13. The radiation sensor of claim 1, wherein
the substrate is glass;
the high refractive index polymer comprises repeat units derived from para-methylstyrene and a first photo-crosslinkable monomer;
the low refractive index polymer consists of repeat units derived from a second photo-crosslinkable monomer and at least one monomer selected from the group consisting of oligoethylene glycol methacrylate, methyl methacrylate, and combinations thereof; and
the first and second photo-crosslinkable monomers each comprise a benzophenone group.

14. The radiation sensor of claim 1, wherein
the support substrate is a flexible support substrate comprising poly(ethylene terephthalate);
the high refractive index polymer comprises repeat units derived from para-methylstyrene and a photo-crosslinkable monomer;
the low refractive index polymer consists of repeat units derived from a photo-crosslinkable monomer and at least one monomer selected from the group consisting of oligoethylene glycol methacrylate, methyl methacrylate, or a combination thereof; and
the first and second photo-crosslinkable monomers each comprise a benzophenone group.

15. The radiation sensor of claim 1,
wherein the low refractive index polymer consists of repeat units derived from oligoethylene glycol methacrylate and the second photo-crosslinkable monomer comprising a benzophenone group; and
wherein a 5 to 300 nanometer blue shift in the wavelength of reflected light of an irradiated region of the sensor occurs upon swelling the low refractive index polymer layers following exposure to a dose of ionizing radiation of greater than 0 to 400 kilogray.

16. The radiation sensor of claim 1,
wherein the low refractive index polymer consists of repeat units derived from methyl methacrylate and the first photo-crosslinkable monomer comprising a benzophenone group; and
wherein a 5 to 300 nanometer red shift in the wavelength of reflected light of an irradiated region of the sensor occurs upon swelling the low refractive index polymer layers following exposure to a dose of ionizing radiation of greater than 0 to 400 kilogray.

17. An article comprising a radiation sensor, the radiation sensor comprising,
a substrate;
a polymer multilayer film comprising alternating layers of a high refractive index polymer and a low refractive index polymer;
wherein the high refractive index polymer comprises repeat units derived from a first photo-crosslinkable monomer; and
wherein the low refractive index polymer consists of repeat units derived from a second photo-crosslinkable monomer and at least one monomer selected from the group consisting of $C_{1-12}$ alkyl (meth)acrylates, $C_{1-12}$ aryl (meth)acrylates, macromeric (meth)acrylates, (meth)acrylic acids, alpha olefins, vinyl esters, vinyl alkyl ethers, styrenic monomers, fluorinated monomers, and combinations thereof;
wherein the article is a wearable patch, a packaging material, a label, or a window pane.

18. A method of detecting radiation, the method comprising,
exposing to ionizing radiation a radiation sensor comprising,
a substrate;
a polymer multilayer film comprising alternating layers of a high refractive index polymer and a low refractive index polymer;
wherein the high refractive index polymer comprises repeat units derived from a first photo-crosslinkable monomer; and wherein the low refractive index polymer consists of repeat units derived from a second photo-crosslinkable monomer and at least one monomer selected from the group consisting of $C_{1-12}$ alkyl (meth)acrylates, $C_{1-12}$ aryl (meth)acrylates, macromeric (meth)acrylates, (meth)acrylic acids, alpha olefins, vinyl esters, vinyl alkyl ethers, styrenic monomers, fluorinated monomers, and combinations thereof;

immersing the sensor in a solvent to swell the low refractive index layers; and monitoring the sensor for a change in color resulting from exposure to a dose of ionizing radiation.

19. The method of claim 18, wherein the dose of ionizing radiation is greater than 0 to 400 kilogray.

20. The method of claim 18, wherein the high refractive index polymer comprises repeat units derived from para-methylstyrene and a photo-crosslinkable monomer comprising benzophenone;

the low refractive index polymer comprises repeat units derived from oligoethylene glycol methacrylate, methyl methacrylate, or a combination thereof and a photo-crosslinkable monomer comprising benzophenone;

the solvent comprises ethanol; and the change in color is a shift in the wavelength of reflected light of about 5 to 300 nanometers.

* * * * *